United States Patent
Wang et al.

(10) Patent No.: US 11,005,827 B2
(45) Date of Patent: May 11, 2021

(54) METHOD AND APPARATUS FOR ACQUIRING VEHICULAR DATA

(71) Applicant: Baidu Online Network Technology (Beijing) Co., Ltd., Beijing (CN)

(72) Inventors: Mingwei Wang, Beijing (CN); Peng Yun, Beijing (CN); Shaohua Zhang, Beijing (CN)

(73) Assignee: Baidu Online Network Technology (Beijing) Co., Ltd., Beijing (CN)

( * ) Notice: Subject to any disclaimer, the term of this patent is extended or adjusted under 35 U.S.C. 154(b) by 238 days.

(21) Appl. No.: 16/025,533

(22) Filed: Jul. 2, 2018

(65) Prior Publication Data

US 2019/0014093 A1 Jan. 10, 2019

(30) Foreign Application Priority Data

Jul. 4, 2017 (CN) .......................... 201710539377.8

(51) Int. Cl.
*H04L 29/06* (2006.01)
*H04L 9/08* (2006.01)
*H04L 9/06* (2006.01)
*G06F 7/58* (2006.01)

(52) U.S. Cl.
CPC ........ *H04L 63/0471* (2013.01); *H04L 9/0662* (2013.01); *H04L 9/0869* (2013.01); *H04L 9/0894* (2013.01); *H04L 63/045* (2013.01); *H04L 63/0435* (2013.01); *G06F 7/588* (2013.01); *H04L 2209/84* (2013.01)

(58) Field of Classification Search
None
See application file for complete search history.

(56) References Cited

U.S. PATENT DOCUMENTS

| | | | | |
|---|---|---|---|---|
| 8,048,174 B2* | 11/2011 | Yamamichi | ......... | B60R 25/2018 726/35 |
| 8,316,237 B1* | 11/2012 | Felsher | ................. | H04L 9/0825 380/282 |
| 8,683,606 B2* | 3/2014 | Masuda | .............. | H04L 63/0428 726/26 |

(Continued)

FOREIGN PATENT DOCUMENTS

| CN | 101739736 A | 6/2010 |
|---|---|---|
| CN | 101918932 A | 12/2010 |

(Continued)

*Primary Examiner* — Maung T Lwin
(74) *Attorney, Agent, or Firm* — Nixon Peabody LLP (57) ABSTRACT

A method and apparatus for acquiring vehicular data. An embodiment of the method includes: acquiring vehicular data of an autonomous vehicle equipped with a vehicular data acquisition device by the vehicular data acquisition device, the vehicular data comprising: a control instruction of the autonomous vehicle and sensor data from a sensor on the autonomous vehicle; encrypting the vehicular data to obtain encrypted vehicular data, and storing the encrypted vehicular data; receiving a request for acquiring vehicular data sent by a server; and sending the encrypted vehicular data to the server when the vehicle identifier is identical to a vehicle identifier of the autonomous vehicle and the device identifier is identical to a device identifier of the vehicular data acquisition device.

9 Claims, 5 Drawing Sheets

(56) References Cited

U.S. PATENT DOCUMENTS

| | | | | |
|---|---|---|---|---|
| 8,862,314 | B2* | 10/2014 | Schmidt | H04L 63/18 |
| | | | | 701/31.5 |
| 2010/0040234 | A1* | 2/2010 | Alrabady | H04L 9/321 |
| | | | | 380/278 |
| 2013/0301829 | A1* | 11/2013 | Kawamura | H04L 9/0869 |
| | | | | 380/44 |
| 2013/0301834 | A1* | 11/2013 | Kawamura | H04W 12/0401 |
| | | | | 380/270 |
| 2013/0332736 | A1* | 12/2013 | Kawamura | H04L 9/3271 |
| | | | | 713/171 |
| 2015/0269790 | A1 | 9/2015 | Batcheller | |
| 2015/0296372 | A1 | 10/2015 | Hieronymi | |
| 2016/0035148 | A1 | 2/2016 | Huang | |
| 2016/0127334 | A1* | 5/2016 | Bangole | H04L 67/12 |
| | | | | 713/171 |
| 2017/0236343 | A1* | 8/2017 | Leboeuf | G07C 9/27 |
| | | | | 340/5.61 |
| 2018/0006819 | A1* | 1/2018 | Watanabe | H04L 9/0822 |
| 2018/0012433 | A1* | 1/2018 | Ricci | G08G 1/096775 |
| 2018/0026949 | A1* | 1/2018 | Kimn | H04L 9/3247 |
| | | | | 713/156 |

FOREIGN PATENT DOCUMENTS

| | | |
|---|---|---|
| CN | 102325320 A | 1/2012 |
| CN | 202364318 U | 8/2012 |
| CN | 104504774 A | 4/2015 |
| CN | 104700469 A | 6/2015 |
| CN | 104798110 A | 7/2015 |
| CN | 105320034 A | 2/2016 |
| CN | 105427403 A | 3/2016 |
| CN | 105577613 A | 5/2016 |
| CN | 105704164 A | 6/2016 |
| CN | 105976450 A | 9/2016 |
| KR | 20170003255 A | 1/2017 |

\* cited by examiner

METHOD AND APPARATUS FOR ACQUIRING VEHICULAR DATA

CROSS-REFERENCE TO RELATED APPLICATIONS

This application is related to and claims priority from Chinese Application No. 201710539377.8, filed on Jul. 4, 2017 and entitled "Method and Apparatus for Acquiring Vehicular Data," the entire disclosure of which is hereby incorporated by reference.

TECHNICAL FIELD

The present disclosure relates to the field of vehicle, specifically to the field of vehicle safety, and more specifically to a method and apparatus for acquiring vehicular data.

BACKGROUND

At present, a device for collecting driving data when a car is traveling is called a dash cam recorder. The dash cam recorder collects images when a vehicle is traveling, and can be used for determining the liability during a car accident using the collected images. However, as a third party device, the dash cam recorder fails to communicate with the vehicle's control system, and cannot acquire key vehicular data such as vehicle control instructions, resulting in failure to determine the actual operation of the vehicle at the moment of the car accident when determining the accident liability. The accident liability can only be determined by relying on the collected images.

SUMMARY

The present disclosure provides a method and apparatus for acquiring vehicular data, to solve one or more technical problems mentioned in the background section.

In a first aspect, the present disclosure provides a method for acquiring vehicular data. The method includes: acquiring vehicular data of an autonomous vehicle equipped with a vehicular data acquisition device by the vehicular data acquisition device, the vehicular data including: a control instruction of the autonomous vehicle and sensor data from a sensor on the autonomous vehicle; encrypting the vehicular data to obtain encrypted vehicular data, and storing the encrypted vehicular data; receiving a request for acquiring vehicular data sent by a server, the request for acquiring vehicular data including: a vehicle identifier and a device identifier; and sending the encrypted vehicular data to the server when the vehicle identifier is identical to a vehicle identifier of the autonomous vehicle and the device identifier is identical to a device identifier of the vehicular data acquisition device.

In a second aspect, the present disclosure provides a method for acquiring vehicular data. The method includes: sending a request for acquiring vehicular data to a vehicular data acquisition device, the request for acquiring vehicular data including: a device identifier of the vehicular data acquisition device, and a vehicle identifier of an autonomous vehicle equipped with the vehicular data acquisition device; receiving encrypted vehicular data sent by the vehicular data acquisition device, and decrypting the encrypted vehicular data to obtain the vehicular data, the vehicular data including: a control instruction of the autonomous vehicle and sensor data from a sensor on the autonomous vehicle.

In a third aspect, the present disclosure provides an apparatus for acquiring vehicular data. The apparatus for acquiring vehicular data includes: an acquiring unit, configured to acquire vehicular data of an autonomous vehicle equipped with a vehicular data acquisition device, the vehicular data including: a control instruction of the autonomous vehicle and sensor data from a sensor on the autonomous vehicle; a processing unit, configured to encrypt the vehicular data to obtain encrypted vehicular data, and store the encrypted vehicular data; a receiving unit, configured to receive a request for acquiring vehicular data sent by a server, the request for acquiring vehicular data including: a vehicle identifier and a device identifier; and a sending unit, configured to send the encrypted vehicular data to the server when the vehicle identifier is identical to a vehicle identifier of the autonomous vehicle and the device identifier is identical to a device identifier of the vehicular data acquisition device.

In a fourth aspect, the present disclosure provides an apparatus for acquiring vehicular data. The apparatus for acquiring vehicular data includes: a request sending unit, configured to send a request for acquiring vehicular data to a vehicular data acquisition device, the request for acquiring vehicular data including: a device identifier of the vehicular data acquisition device, and a vehicle identifier of an autonomous vehicle equipped with the vehicular data acquisition device; a vehicular data receiving unit, configured to receive encrypted vehicular data sent by the vehicular data acquisition device, and decrypting the encrypted vehicular data to obtain the vehicular data, the vehicular data including: a control instruction of the autonomous vehicle and sensor data from a sensor on the autonomous vehicle.

The method and apparatus for acquiring vehicular data provided by the present disclosure acquire vehicular data of an autonomous vehicle equipped with a vehicular data acquisition device by the vehicular data acquisition device, the vehicular data including: a control instruction of the autonomous vehicle and sensor data from a sensor on the autonomous vehicle; encrypt the vehicular data to obtain encrypted vehicular data, and store the encrypted vehicular data; receive a request for acquiring vehicular data sent by a server, the request for acquiring vehicular data including: a vehicle identifier and a device identifier; and send the encrypted vehicular data to the server when the vehicle identifier is identical to a vehicle identifier of the autonomous vehicle and the device identifier is identical to a device identifier of the vehicular data acquisition device. The present disclosure has achieved recording key vehicular data such as vehicle control instructions of the autonomous vehicle, thereby accurately determining the accident liability during an accident using the key vehicular data.

BRIEF DESCRIPTION OF THE DRAWINGS

By reading and referring to detailed description on the non-limiting embodiments in the following accompanying drawings, other features, objects and advantages of the present disclosure will become more apparent.

DETAILED DESCRIPTION OF EMBODIMENTS

The present disclosure will be further described below in detail in combination with the accompanying drawings and the embodiments. It should be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should be noted that the embodiments in the present disclosure and the features in the embodiments may be combined with each other on a non-conflict basis. The present disclosure will be described below in detail with reference to the accompanying drawings and in combination with the embodiments.

Figure 1:
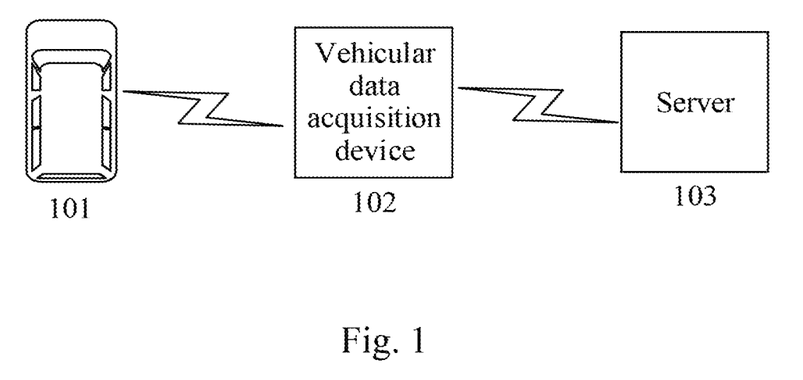
FIG. 1 shows an exemplary system architecture in which a method for acquiring vehicular data according to the present disclosure may be implemented.

FIG. 1 shows an exemplary system architecture in which an embodiment of a method for acquiring vehicular data according to the present disclosure may be implemented.

As shown in FIG. 1, the system architecture includes an autonomous vehicle 101, a vehicular data acquisition device 102, and a server 103.

A communication connection between the autonomous vehicle 101 and the vehicular data acquisition device 102 may include, but is not limited to: an onboard Ethernet bus, a CAN bus and a hardwired connection. The vehicular data acquisition device 102 is installed on the autonomous vehicle 101. 3G, LTE or 4G may be used for a communication connection between the vehicular data acquisition device 102 and the server 103.

The autonomous vehicle 101 is equipped with devices such as a processor, a memory, a GPS, a camera, a laser radar, an Ethernet card, an onboard Ethernet card, a CAN bus driver chip, and the like. The vehicular data acquisition device 102 is equipped with devices such as a processor, a memory, an onboard Ethernet card, a CAN bus driver chip, and the like.

A control system of the autonomous vehicle 101 may include, but is not limited to: an image recognition unit, a ranging unit, and a driving decision making unit running on an operating system of the autonomous vehicle 101. The image recognition unit may be used for identifying an obstacle object in a driving environment of the autonomous vehicle based a road condition image acquired by a camera. The ranging unit may determine a distance between the autonomous vehicle and each obstacle based on a location of a laser point corresponding to each obstacle object in an acquired laser point cloud. The driving decision making unit may determine a driving strategy, generate a corresponding control instruction, and control traveling of the autonomous vehicle based on a recognition result from the image recognition unit and a measurement result from the ranging unit.

The vehicular data acquisition device 102 may acquire vehicular data of the autonomous vehicle 101 through an onboard Ethernet. The vehicular data acquisition device 102 may read data written on the CAN bus by a control part of the autonomous vehicle 101 connected to the CAN bus through the CAN bus. For example, a control part, such as an engine control part, an ABS control part or an airbag control part, of the autonomous vehicle, is connected to the CAN bus, and the vehicular data acquisition device may read data written on the CAN bus by a control part, such as the engine control part, the ABS control part or the airbag control part, of the autonomous vehicle through the CAN bus.

Figure 2:
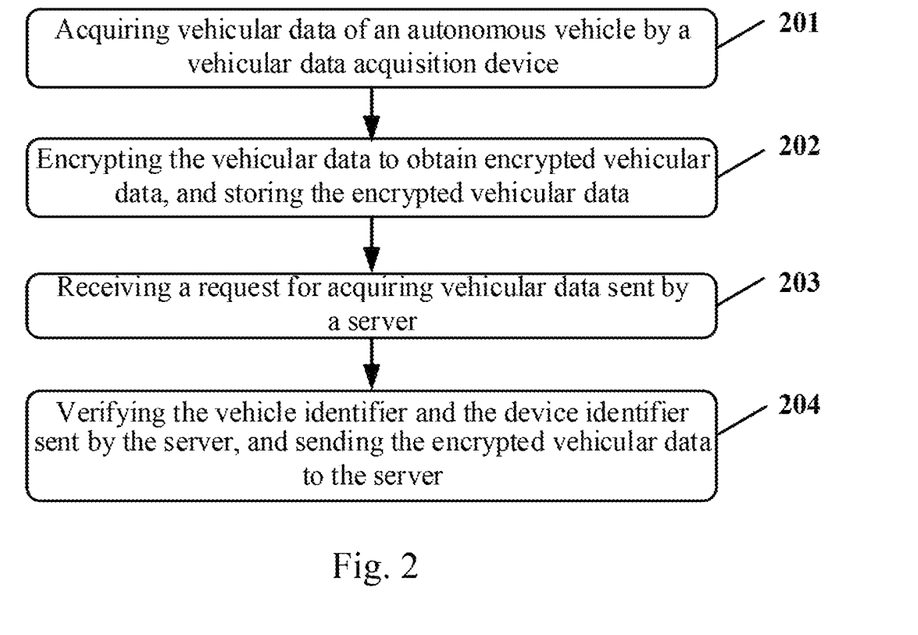
FIG. 2 shows a flowchart diagram of an embodiment of a method for acquiring vehicular data according to the present disclosure.

Please refer to FIG. 2, FIG. 2 shows a flow of an embodiment of a method for acquiring vehicular data according to the present disclosure. The method for acquiring vehicular data provided by an embodiment of the present disclosure may be executed by a vehicular data acquisition device. The method includes the following steps.

Step 201: acquiring vehicular data of an autonomous vehicle by a vehicular data acquisition device.

The vehicular data acquisition device may acquire vehicular data of the autonomous vehicle through an onboard Ethernet. The vehicular data may include, but are not limited to: a control instruction of the autonomous vehicle and sensor data from a sensor on the autonomous vehicle. The control instruction of the autonomous vehicle may include, but is not limited to: an acceleration instruction, a deceleration instruction, a braking instruction and a steering instruction. The sensor data of the autonomous vehicle may include, but are not limited to: sensor data collected by a sensor, such as a laser radar, a millimeter wave radar, an ultrasonic radar, or a camera, on the autonomous vehicle.

The autonomous vehicle may first write vehicular data in a segment of a storage area in an internal storage of a memory on the autonomous vehicle. For example, vehicular data are a control instruction generated by a driving decision making unit on an operating system of the autonomous vehicle. The driving decision making unit may write, after generating each control instruction, the each control instruction in a segment of a storage area. The vehicular data acquisition device may send a request for acquiring vehicular data to the autonomous vehicle through the onboard Ethernet. After receiving the request for acquiring vehicular data sent by the vehicular data acquisition device, the autonomous vehicle may read the vehicular data from a storage area storing the vehicular data in an internal storage, and send the vehicular data to the vehicular data acquisition device through the onboard Ethernet. Thus, the vehicular data acquisition device may receive the vehicular data sent by the autonomous vehicle through the onboard Ethernet to acquire the vehicular data of the autonomous vehicle.

Step 202: encrypting the vehicular data to obtain encrypted vehicular data, and storing the encrypted vehicular data.

In the embodiment, after acquiring the vehicular data of the autonomous vehicle in the step 201, the vehicular data may be encrypted using a key to obtain encrypted vehicular data, and the encrypted vehicular data may be stored.

In the embodiment, the key for encrypting vehicular data may be generated using a symmetric key generation algorithm. The vehicular data may be encrypted using a key generated using the symmetric key generation algorithm to obtain encrypted vehicular data, and the encrypted vehicular data may be stored.

In some optional implementations of the embodiment, a transmission key for encrypting vehicular data transmitted between a vehicular data acquisition device and a server may be generated simultaneously in the vehicular data acquisition device and the server. Before acquiring the vehicular data of the autonomous vehicle, the vehicular data acquisition device may send a generation parameter to the server, and the generation parameter includes: a vehicle identifier of the autonomous vehicle, a network card address of the vehicular data acquisition device, and a random number generated by a random number generator on the vehicular data acquisition device. After the vehicular data acquisition device sends the generation parameter to the server, the server may generate a transmission key using a preset symmetric key generation algorithm based on the generation parameter, and generate a notification message instructing to generate the transmission key. The server may send the notification message to the vehicular data acquisition device. After receiving the notification message, the vehicular data acquisition device may generate a transmission key based on the generation parameter using a preset symmetric key generation algorithm identical to the preset symmetric key generation algorithm used by the server to generate a transmission key. Thus, the transmission key for encrypting vehicular data transmitted between the vehicular data acquisition device and the server is generated simultaneously in the vehicular data acquisition device and the server. In this process, the transmission key is not transmitted between the vehicular data acquisition device and the server, and safety of the transmission key may be guaranteed.

In some optional implementations of the embodiment, after a transmission key for encrypting vehicular data transmitted between the vehicular data acquisition device and the server is generated simultaneously in the vehicular data acquisition device and the server, the vehicular data may be encrypted by the vehicular data acquisition device using the transmission key to obtain encrypted vehicular data. Encrypted vehicular data having not been written in a storage area corresponding to the vehicular data may be written into the storage area corresponding to the vehicular data in the form of data stream. Whether a time difference between a start time of writing encrypted vehicular data having not been written in a storage area corresponding to the vehicular data into the storage area corresponding to the vehicular data from a start address of the storage area and a current time is greater than a preset time length, e.g., 30 min, may be determined prior to writing the encrypted vehicular data into the storage area corresponding to the vehicular data. The encrypted vehicular data having not been written in the storage area corresponding to the vehicular data may be written into the storage area from the start address of the storage area corresponding to the vehicular data by overwriting when the time difference between the start time of writing the encrypted vehicular data having not been written in the storage area corresponding to the vehicular data into the storage area corresponding to the vehicular data from the start address of the storage area and the current time is greater than the preset time length. The encrypted vehicular data having not been written in the storage area corresponding to the vehicular data may be written into the storage area from a start address of a remaining storage space of the storage area when the time difference between the start time of writing the encrypted vehicular data having not been written in the storage area corresponding to the vehicular data into the storage area corresponding to the vehicular data from the start address of the storage area and the current time is less than the preset time length. That is, the encrypted vehicular data having not been written in the storage area corresponding to the vehicular data may be written into the storage area from the start address of the storage area by overwriting at intervals of the preset time length.

Step 203: receiving a request for acquiring vehicular data sent by a server.

In the embodiment, when a server needs to read vehicular data recorded by a vehicular data acquisition device, for example, after an autonomous vehicle has an accident, the server may send a request for reading the vehicular data to the vehicular data acquisition device to acquire the vehicular data of the autonomous vehicle, and may determine the accident liability based on control instructions of the autonomous vehicle in the vehicular data.

When the server needs to read the vehicular data recorded by the vehicular data acquisition device, the request for acquiring the vehicular data sent by the server may be received. The request for acquiring the vehicular data sent by the server includes: a vehicle identifier and a device identifier.

In the embodiment, there may be one-to-one correspondence between the device identifier of the data acquisition device and the vehicle identifier of the autonomous vehicle. The server may pre-store device identifiers of a plurality of data acquisition devices and vehicle identifiers of autonomous vehicles equipped with the data acquisition devices correspondingly.

In the embodiment, the vehicle identifier of the autonomous vehicle may use a vehicle identification number (VIN) of the autonomous vehicle. The device identifier of the vehicular data acquisition device may use a unique identification number of the vehicular data acquisition device before leaving the factory.

Step 204: verifying the vehicle identifier and the device identifier sent by the server, and sending the encrypted vehicular data to the server.

In the embodiment, after receiving a request for acquiring vehicular data sent by a server in the step 203, whether the vehicle identifier sent by the server is identical to a vehicle identifier of the autonomous vehicle equipped with the vehicular data acquisition device, and whether the device identifier sent by the server is identical to a device identifier of the vehicular data acquisition device may be determined.

For example, a vehicle identifier of an autonomous vehicle is a VIN of the autonomous vehicle, and a device identifier of a vehicular data acquisition device is a unique identification number of the vehicular data acquisition device before leaving the factory. When a VIN sent by a server is identical to the VIN of the autonomous vehicle equipped with the vehicular data acquisition device, and the device identifier sent by the server is identical to a unique identification number of the vehicular data acquisition device before leaving the factory, the vehicular data acquisition device completes verifying the server, and may send the encrypted vehicular data to the server.

In the embodiment, the key for encrypting vehicular data may be generated using a symmetric key generation algorithm. A key generated using the symmetric key generation algorithm may be pre-stored in the server. Thus, after receiving the encrypted vehicular data sent by the vehicular data acquisition device, the server may decrypt the encrypted data using the pre-stored key generated using the symmetric key generation algorithm to obtain the vehicular data of the autonomous vehicle.

In some optional implementations of the embodiment, the vehicular data acquisition device may, after startup, send a request for acquiring a vehicle identifier to the autonomous vehicle equipped with the vehicular data acquisition device, and then may receive the vehicle identifier sent by the autonomous vehicle equipped with the acquisition device. The device identifier of the vehicular data acquisition device may be stored in firmware of the vehicular data acquisition device. The vehicular data acquisition device may, after startup, read the device identifier of the vehicular data acquisition device from the firmware, and store the device identifier of the vehicular data acquisition device and the vehicle identifier of the autonomous vehicle equipped with the vehicular data acquisition device correspondingly.

For example, a vehicle identifier of an autonomous vehicle is a VIN of the autonomous vehicle, and a device identifier of a vehicular data acquisition device is a unique identification number of the vehicular data acquisition device before leaving the factory. A unique identification number of each vehicular data acquisition device before leaving the factory respectively corresponds to a VIN of an autonomous vehicle equipped with the vehicular data acquisition device. The server may pre-store unique device identification numbers of a plurality of vehicular data acquisition devices before leaving the factory and VINs of autonomous vehicles equipped with the vehicular data acquisition devices correspondingly.

The vehicular data acquisition device may, after startup, send a request for acquiring a vehicle identifier to the autonomous vehicle equipped with the vehicular data acquisition device, and then may receive a VIN of the autonomous vehicle sent by the autonomous vehicle equipped with the acquisition device. The unique identification number of the vehicular data acquisition device before leaving the factory may be stored in firmware of the vehicular data acquisition device. The vehicular data acquisition device may, after startup, read the unique identification number of the vehicular data acquisition device before leaving factory from the firmware, and store the unique identification number of the vehicular data acquisition device before leaving factory and the VIN of the autonomous vehicle equipped with the vehicular data acquisition device correspondingly.

In some optional implementations of the embodiment, a sensor signal of the autonomous vehicle may be monitored, and the sensor signal includes: an airbag initialization signal and a collision sensor output signal. For example, the vehicular data acquisition device may be connected with an airbag sensor or a collision sensor of the autonomous vehicle using a hardwired connection, and an airbag initialization signal or a collision sensor output signal may be received through the hardwired connection during airbag initialization or vehicle collision. In response to monitoring the sensor signal of the autonomous vehicle, vehicular data in a preset time length prior to the monitoring the sensor signal may be stored in a preset permanent storage area. Therefore, provided that the vehicular data acquisition device monitors an airbag unit initialization signal or a collision sensor output signal when an autonomous vehicle has an accident, the vehicular data acquisition device may separately store important vehicular data in a time period prior to a moment of occurrence of the accident in a preset permanent storage area, to avoid overwriting the important vehicular data in the time period prior to the moment of occurrence of the accident by continuously writing vehicular data in a storage area corresponding to the vehicular data in the form of a data stream.

Figure 3:
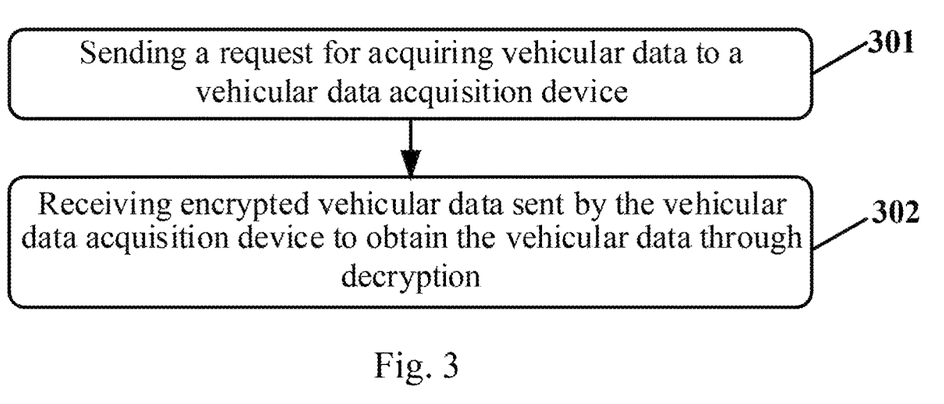
FIG. 3 shows a flowchart diagram of another embodiment of a method for acquiring vehicular data according to the present disclosure.

Please refer to FIG. 3, FIG. 3 shows a flow of another embodiment of a method for acquiring vehicular data according to the present disclosure. The method for acquiring vehicular data provided by an embodiment of the present disclosure may be executed by a server. The method includes the following steps.

Step 301: sending a request for acquiring vehicular data to a vehicular data acquisition device.

In the embodiment, when a server needs to read vehicular data of an autonomous vehicle equipped with a vehicular data acquisition device recorded by the vehicular data acquisition device, for example, when the autonomous vehicle has an accident, the server may send a request for reading vehicular data to the vehicular data acquisition device to acquire the vehicular data of the autonomous vehicle equipped with the vehicular data acquisition device, and may determine the accident liability based on control instructions of the autonomous vehicle in the vehicular data. When a server needs to read vehicular data recorded by a vehicular data acquisition device, the server may send a request for acquiring vehicular data to the vehicular data acquisition device, and the request for acquiring vehicular data sent by the server includes: a device identifier of the vehicular data acquisition device, and a vehicle identifier of the autonomous vehicle equipped with the vehicular data acquisition device.

In the embodiment, there may be one-to-one correspondence between the device identifier of the data acquisition device and the vehicle identifier of the autonomous vehicle. The server may pre-store device identifiers of a plurality of data acquisition devices and vehicle identifiers of autonomous vehicles equipped with the data acquisition devices correspondingly.

The vehicular data acquisition device may, after startup, send a request for acquiring a vehicle identifier to the autonomous vehicle equipped with the vehicular data acquisition device, and then may receive the vehicle identifier sent by the autonomous vehicle equipped with the acquisition device. The device identifier of the vehicular data acquisition device may be stored in firmware of the vehicular data acquisition device. The vehicular data acquisition device may, after startup, read the device identifier of the vehicular data acquisition device from the firmware, and store the device identifier of the vehicular data acquisition device and the vehicle identifier of the autonomous vehicle equipped with the vehicular data acquisition device correspondingly.

For example, a vehicle identifier of an autonomous vehicle is a VIN of the autonomous vehicle, and a device identifier of a vehicular data acquisition device is a unique identification number of the vehicular data acquisition device before leaving factory. The server may pre-store unique device identification numbers of a plurality of vehicular data acquisition devices before leaving factory and VINs of autonomous vehicles equipped with the vehicular data acquisition devices correspondingly.

The vehicular data acquisition device may, after startup, send a request for acquiring a vehicle identifier to the autonomous vehicle equipped with the vehicular data acquisition device, and then may receive a VIN of the autonomous vehicle sent by the autonomous vehicle equipped with the acquisition device. The unique identification number of the vehicular data acquisition device before leaving factory may be stored in firmware of the vehicular data acquisition device. The vehicular data acquisition device may, after startup, read the unique identification number of the vehicular data acquisition device before leaving factory from the firmware, and store the unique identification number of the vehicular data acquisition device before leaving factory and the VIN of the autonomous vehicle equipped with the vehicular data acquisition device correspondingly.

Step 302: receiving encrypted vehicular data sent by the vehicular data acquisition device to obtain the vehicular data through decryption.

In the embodiment, after the server sends a request for acquiring vehicular data to the vehicular data acquisition device, the vehicular data acquisition device may determine whether the device identifier sent by the server is identical to the pre-stored device identifier of the vehicular data acquisition device, and whether the vehicle identifier sent by the server is identical to the pre-stored vehicle identifier of the autonomous vehicle equipped with the vehicular data acquisition device in the vehicular data acquisition device. Thus, the vehicular data acquisition device completes verifying the server, and sends the encrypted the vehicular data to the server.

For example, a vehicle identifier of an autonomous vehicle is a VIN of the autonomous vehicle, and a device identifier of a vehicular data acquisition device is a unique identification number of the vehicular data acquisition device before leaving factory. When a VIN sent by a server is identical to a pre-stored VIN of an autonomous vehicle equipped with a vehicular data acquisition device in the vehicular data acquisition device, and a device identifier sent by the server is identical to a pre-stored unique identification number of the vehicular data acquisition device before leaving factory, the vehicular data acquisition device completes verifying the server, and may send the encrypted vehicular data to the server.

In the embodiment, the key for encrypting vehicular data may be generated using a symmetric key generation algorithm. A key generated using a symmetric key generation algorithm may be pre-stored in the server. Thus, after receiving vehicular data encrypted with a key generated using the symmetric key generation algorithm sent by the vehicular data acquisition device, the server may decrypt the received encrypted vehicular data using the pre-stored key identical to the key used by the vehicular data acquisition device to encrypt the vehicular data, thereby obtaining the vehicular data of the autonomous vehicle.

In some optional implementations of the embodiment, a transmission key for encrypting vehicular data transmitted between a vehicular data acquisition device and a server may be generated simultaneously in the vehicular data acquisition device and the server. When generating a transmission key, the server may receive a generation parameter sent by the data acquisition device, and the generation parameter includes: the vehicle identifier of the autonomous vehicle equipped with the data acquisition device such as a VIN, a network card address of the vehicular data acquisition device such as a MAC address, and a random number generated by a random number generator on the vehicular data acquisition device. After receiving the generation parameter, the server may generate a transmission key using a preset symmetric key generation algorithm based on the generation parameter, and generate a notification message instructing to generate the transmission key. The server may send the notification message to the vehicular data acquisition device. After receiving the notification message, the vehicular data acquisition device may generate a transmission key based on the generation parameter using the same preset symmetric key generation algorithm as the server. Thus, the transmission key for encrypting vehicular data transmitted between the vehicular data acquisition device and the server is generated simultaneously in the vehicular data acquisition device and the server. The vehicular data acquisition device may encrypt vehicular data using a transmission key, and the server may decrypt the encrypted data using the same transmission key as the vehicular data acquisition device. In this process, the transmission key is not transmitted between the vehicular data acquisition device and the server, thereby guaranteeing safety of the transmission key.

Figure 4:
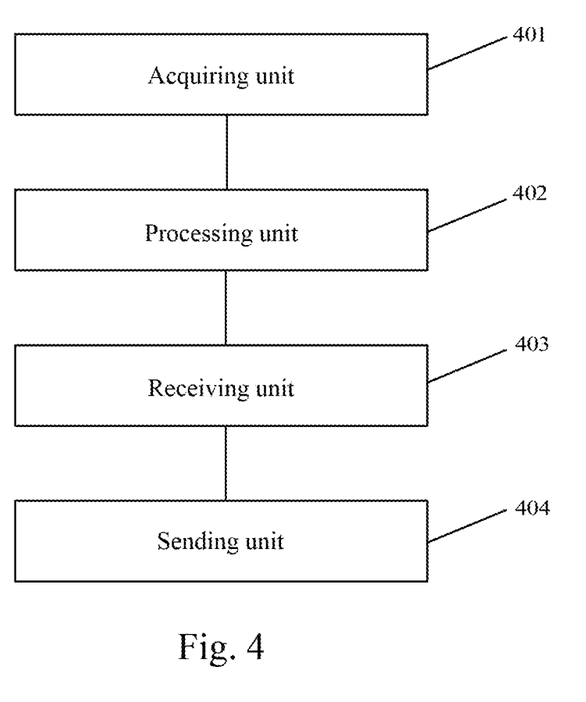
FIG. 4 shows a schematic structural diagram of an embodiment of an apparatus for acquiring vehicular data according to the present disclosure.

Please refer to FIG. 4, FIG. 4 shows a schematic structural diagram of an embodiment of an apparatus for acquiring vehicular data according to the present disclosure. The embodiment of the apparatus corresponds to the embodiment of the method shown in FIG. 2.

As shown in FIG. 4, the apparatus for acquiring vehicular data includes: an acquiring unit 401, a processing unit 402, a receiving unit 403 and a sending unit 404. Here, the acquiring unit 401 is configured to acquire vehicular data of an autonomous vehicle equipped with a vehicular data acquisition device, the vehicular data including: a control instruction of the autonomous vehicle and sensor data from a sensor on the autonomous vehicle; the processing unit 402 is configured to encrypt the vehicular data to obtain encrypted vehicular data, and store the encrypted vehicular data; the receiving unit 403 is configured to receive a request for acquiring vehicular data sent by a server, the request for acquiring vehicular data including: a vehicle identifier and a device identifier; and the sending unit 404 is configured to send the encrypted vehicular data to the server when the vehicle identifier is identical to a vehicle identifier of the autonomous vehicle and the device identifier is identical to a device identifier of the vehicular data acquisition device.

In some optional implementations of the embodiment, the processing unit is further configured to: encrypt the vehicular data using a transmission key; determine whether a time difference between a start time of writing encrypted vehicular data having not been written in a storage area corresponding to the vehicular data into the storage area corresponding to the vehicular data from a start address of the storage area and a current time is greater than a preset time length; write the encrypted vehicular data having not been written in the storage area into the storage area corresponding to the vehicular data from the start address of the storage area corresponding to the vehicular data by overwriting if the time difference between the start time of writing the encrypted vehicular data having not been written in the storage area corresponding to the vehicular data into the storage area corresponding to the vehicular data from the start address of the storage area and the current time is greater than the preset time length; and write the encrypted vehicular data having not been written in the storage area corresponding to the vehicular data into the storage area corresponding to the vehicular data from a start address of a remaining storage space of the storage area if the time difference between the start time of writing the encrypted vehicular data having not been written in the storage area corresponding to the vehicular data into the storage area corresponding to the vehicular data from the start address of the storage area and the current time is less than or equal to the preset time length.

In some optional implementations of the embodiment, the apparatus for acquiring vehicular data further includes a vehicle identifier acquiring unit, configured to: send a request for acquiring a vehicle identifier to an autonomous vehicle; receive the vehicle identifier sent by the autonomous vehicle; and store a device identifier of the vehicular data acquisition device and the vehicle identifier of the autonomous vehicle correspondingly. The apparatus for acquiring vehicular data further includes a transmission key generation unit, configured to: send a generation parameter to a server, the generation parameter including: the vehicle identifier of the autonomous vehicle, a network card address of the vehicular data acquisition device, and a random number generated by a random number generator on the vehicular data acquisition device; receive a notification message sent by the server, the notification message instructing to generate a transmission key using a preset symmetric key generation algorithm based on the generation parameter; and generate the transmission key using the preset symmetric key generation algorithm based on the generation parameter. The apparatus for acquiring vehicular data further includes a signal monitoring unit, configured to: monitor a sensor signal of the autonomous vehicle, the sensor signal including: an airbag initialization signal or a collision sensor output signal; and store, in response to monitoring the sensor signal of the autonomous vehicle, vehicular data in a preset time length prior to the monitoring the sensor signal into a preset permanent storage area.

Figure 5:
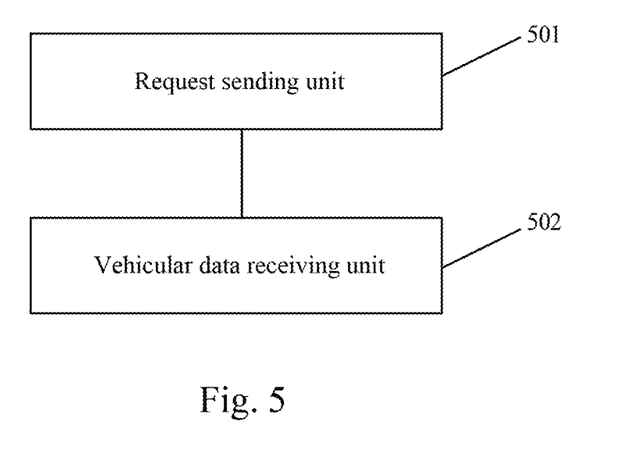
FIG. 5 shows a schematic structural diagram of another embodiment of an apparatus for acquiring vehicular data according to the present disclosure.

Please refer to FIG. 5, FIG. 5 shows a schematic structural diagram of another embodiment of an apparatus for acquiring vehicular data according to the present disclosure. The embodiment of the apparatus corresponds to the embodiment of the method shown in FIG. 3.

As shown in FIG. 5, the apparatus for acquiring vehicular data includes: a request sending unit 501 and a vehicular data receiving unit 502. Here, the request sending unit 501 is configured to send a request for acquiring vehicular data to a vehicular data acquisition device, the request for acquiring vehicular data including: a device identifier of the vehicular data acquisition device, and a vehicle identifier of an autonomous vehicle equipped with the vehicular data acquisition device; the vehicular data receiving unit 502 is configured to receive encrypted vehicular data sent by the vehicular data acquisition device, and decrypt the encrypted vehicular data to obtain the vehicular data, the vehicular data including: a control instruction of the autonomous vehicle and sensor data from a sensor on the autonomous vehicle.

In some optional implementations of the embodiment, the apparatus for acquiring vehicular data further includes: a notification message generation unit, configured to: receive a generation parameter sent by the vehicular data acquisition device, the generation parameter including: the vehicle identifier of the autonomous vehicle, a network card address of the vehicular data acquisition device, and a random number generated by a random number generator on the vehicular data acquisition device; generate a transmission key using a preset symmetric key generation algorithm based on the generation parameter, and generate a notification message instructing to generate the transmission key; and send the notification message to the vehicular data acquisition device.

The present disclosure further provides a vehicular data acquisition device. The vehicular data acquisition device may be configured with one or more processors; and a memory for storing one or more programs, where the one or more programs may contain instructions for executing the operations according to the steps 201-204. The one or more programs enable, when executed by the one or more processors, the one or more processors to execute the operations according to the steps 201-204.

The present disclosure further provides a server. The server may be configured with one or more processors; and a memory for storing one or more programs, where the one or more programs may contain instructions for executing the operations according to the steps 301-302. The one or more programs enable, when executed by the one or more processors, the one or more processors to execute the operations according to the steps 301-302.

The present disclosure further provides a non-transitory computer readable medium. The computer readable medium may be included in the vehicular data acquisition device; or may be a stand-alone computer-readable storage medium not assembled into the vehicular data acquisition device. The non-transitory computer readable medium stores one or more programs, where the one or more programs enable, when executed by the vehicular data acquisition device, the vehicular data acquisition device to: acquire vehicular data of an autonomous vehicle equipped with the vehicular data acquisition device, the vehicular data including: a control instruction of the autonomous vehicle and sensor data from a sensor on the autonomous vehicle; encrypt the vehicular data to obtain encrypted vehicular data, and store the encrypted vehicular data; receive a request for acquiring vehicular data sent by a server, the request for acquiring vehicular data including: a vehicle identifier and a device identifier; and send the encrypted vehicular data to the server when the vehicle identifier is identical to a vehicle identifier of the autonomous vehicle and the device identifier is identical to a device identifier of the vehicular data acquisition device.

The present disclosure further provides a non-transitory computer readable medium. The computer readable medium may be included in the server; or may be a stand-alone computer-readable storage medium not assembled into the server. The non-transitory computer readable medium stores one or more programs, where the one or more programs enable, when executed by the server, the server to: send a request for acquiring vehicular data to a vehicular data acquisition device, the request for acquiring vehicular data including: a device identifier of the vehicular data acquisition device, and a vehicle identifier of the autonomous vehicle equipped with the vehicular data acquisition device; receive encrypted vehicular data sent by the vehicular data acquisition device, and decrypt the encrypted vehicular data to obtain the vehicular data, the vehicular data including: a control instruction of the autonomous vehicle and sensor data from a sensor on the autonomous vehicle.

It should be noted that the non-transitory computer readable medium in the present disclosure may be computer readable signal medium or non-transitory computer readable storage medium or any combination of the above two. An example of the computer readable storage medium may include, but not limited to: electric, magnetic, optical, electromagnetic, infrared, or semiconductor systems, apparatus, elements, or a combination any of the above. A more specific example of the computer readable storage medium may include but is not limited to: electrical connection with one or more wire, a portable computer disk, a hard disk, a random access memory (RAM), a read only memory (ROM), an erasable programmable read only memory (EPROM or flash memory), a fibre, a portable compact disk read only memory (CD-ROM), an optical memory, a magnet memory or any suitable combination of the above. In the present disclosure, the non-transitory computer readable storage medium may be any physical medium containing or storing programs which can be used by a command execution system, apparatus or element or incorporated thereto. In the present disclosure, the computer readable signal medium may include data signal in the base band or propagating as parts of a carrier, in which computer readable program codes are carried. The propagating signal may take various forms, including but not limited to: an electromagnetic signal, an optical signal or any suitable combination of the above. The signal medium that can be read by computer may be any non-transitory computer readable medium except for the non-transitory computer readable storage medium. The computer readable medium is capable of transmitting, propagating or transferring programs for use by, or used in combination with, a command execution system, apparatus or element. The program codes contained on the computer readable medium may be transmitted with any suitable medium including but not limited to: wireless, wired, optical cable, RF medium etc., or any suitable combination of the above.

The above description only provides an explanation of the preferred embodiments of the present disclosure and the technical principles used. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the disclosure. Technical schemes formed by the above-described features being interchanged with, but not limited to, technical features with similar functions disclosed in the present disclosure are examples.

What is claimed is:

1. A method for acquiring vehicular data, comprising:
   sending, by a vehicular data acquisition device, a generation parameter to a server, the generation parameter comprising at least one of: a vehicle identifier of an autonomous vehicle equipped with the vehicular data acquisition device, a network card address of the vehicular data acquisition device, or a random number generated by a random number generator on the vehicular data acquisition device;
   receiving a notification message sent by the server, the notification message instructing to generate a transmission key using a preset symmetric key generation algorithm based on the generation parameter;
   generating the transmission key using the preset symmetric key generation algorithm based on the generation parameter;
   acquiring, by the vehicular data acquisition device, vehicular data of the autonomous vehicle equipped with the vehicular data acquisition device, the vehicular data comprising: a control instruction of the autonomous vehicle and sensor data from a sensor on the autonomous vehicle;
   encrypting the vehicular data to obtain encrypted vehicular data, and storing the encrypted vehicular data;
   receiving a request sent by the server for acquiring the vehicular data, the request comprising: a vehicle identifier and a device identifier; and
   sending the encrypted vehicular data to the server when the vehicle identifier sent by the server is identical to the vehicle identifier of the autonomous vehicle stored in the vehicular data acquisition device and the device identifier sent by the server is identical to a device identifier of the vehicular data acquisition device stored in the vehicular data acquisition device.

2. The method according to claim 1, wherein before the acquiring vehicular data of an autonomous vehicle equipped with a vehicular data acquisition device by the vehicular data acquisition device, the method further comprises:
   sending a request for acquiring the vehicle identifier of the autonomous vehicle to the autonomous vehicle;
   receiving the vehicle identifier of the autonomous vehicle sent by the autonomous vehicle; and
   storing the device identifier of the vehicular data acquisition device and the vehicle identifier of the autonomous vehicle together into the vehicular data acquisition device.

3. The method according to claim 1, wherein the encrypting the vehicular data to obtain encrypted vehicular data, and storing the encrypted vehicular data comprises:
   encrypting the vehicular data using the transmission key; and
   writing the encrypted vehicular data into a storage area corresponding to the vehicular data.

4. The method according to claim 3, wherein the writing the encrypted vehicular data in a storage area corresponding to the vehicular data comprises:
   determining whether a time difference between a start time of writing encrypted vehicular data having not been written in a storage area corresponding to the vehicular data into the storage area corresponding to the vehicular data from a start address of the storage area and a current time is greater than a preset time length;
   writing the encrypted vehicular data having not been written in the storage area into the storage area corresponding to the vehicular data from the start address of the storage area corresponding to the vehicular data by overwriting if the time difference between the start time of writing the encrypted vehicular data having not been written in the storage area corresponding to the vehicular data into the storage area corresponding to the vehicular data from the start address of the storage area corresponding to the vehicular data and the current time is greater than the preset time length; and
   writing the encrypted vehicular data having not been written in the storage area corresponding to the vehicular data into the storage area corresponding to the vehicular data from a start address of a remaining storage space of the storage area if the time difference between the start time of writing the encrypted vehicular data having not been written in the storage area corresponding to the vehicular data into the storage area corresponding to the vehicular data from the start address of the storage area and the current time is less than or equal to the preset time length.

5. The method according to claim 4, further comprising:
   monitoring a sensor signal of the autonomous vehicle, the sensor signal comprising: an airbag initialization signal and a collision sensor output signal; and
   storing, in response to monitoring the sensor signal of the autonomous vehicle, vehicular data in a preset time length prior to the monitoring the sensor signal into a preset permanent storage area.

6. A method for acquiring vehicular data, comprising:
   receiving, by a server, a generation parameter sent by a vehicular data acquisition device, the generation parameter comprising at least one of: a vehicle identifier of an autonomous vehicle equipped with the vehicular data acquisition device, a network card address of the vehicular data acquisition device, or a random number generated by a random number generator on the vehicular data acquisition device;
   generating a transmission key using a preset symmetric key generation algorithm based on the generation parameter, and generating a notification message instructing to generate the transmission key;
   sending the notification message to the vehicular data acquisition device;
   sending, by the server, a request for acquiring vehicular data to the vehicular data acquisition device, the request comprising: a device identifier and a vehicle identifier; and
   receiving encrypted vehicular data sent by the vehicular data acquisition device, and decrypting the encrypted vehicular data to obtain the vehicular data, the vehicular data comprising: a control instruction of the autonomous vehicle and sensor data from a sensor on the autonomous vehicle, the encrypted vehicular data being sent by the vehicular data acquisition device when the vehicle identifier sent by the server is identical to the vehicle identifier of the autonomous vehicle stored in the vehicular data acquisition device and the device identifier sent by the server is identical to a device identifier of the vehicular data acquisition device stored in the vehicular data acquisition device.

7. An apparatus for acquiring vehicular data, comprising:
at least one processor; and
a memory storing instructions, the instructions when executed by the at least one processor, cause the at least one processor to perform operations, the operations comprising:
sending, by a vehicular data acquisition device, a generation parameter to a server, the generation parameter comprising at least one of: a vehicle identifier of an autonomous vehicle equipped with the vehicular data acquisition device, a network card address of the vehicular data acquisition device, or a random number generated by a random number generator on the vehicular data acquisition device;
receiving a notification message sent by the server, the notification message instructing to generate a transmission key using a preset symmetric key generation algorithm based on the generation parameter;
generating the transmission key using the preset symmetric key generation algorithm based on the generation parameter;
acquiring, by the vehicular data acquisition device, vehicular data of the autonomous vehicle equipped with the vehicular data acquisition device, the vehicular data comprising: a control instruction of the autonomous vehicle and sensor data from a sensor on the autonomous vehicle;
encrypting the vehicular data to obtain encrypted vehicular data, and storing the encrypted vehicular data;
receiving a request sent by the server for acquiring the vehicular data, the request comprising: a vehicle identifier and a device identifier; and
sending the encrypted vehicular data to the server when the vehicle identifier sent by the server is identical to the vehicle identifier of the autonomous vehicle stored in the vehicular data acquisition device and the device identifier sent by the server is identical to a device identifier of the vehicular data acquisition device stored in the vehicular data acquisition device.

8. The apparatus according to claim 7, the operations further comprising:
sending a request for acquiring the vehicle identifier of the autonomous vehicle to the autonomous vehicle; receiving the vehicle identifier of the autonomous vehicle sent by the autonomous vehicle; and storing the device identifier of the vehicular data acquisition device and the vehicle identifier of the autonomous vehicle together into the vehicular data acquisition device; and
monitoring a sensor signal of the autonomous vehicle, the sensor signal comprising: an airbag initialization signal and a collision sensor output signal; and storing, in response to monitoring the sensor signal of the autonomous vehicle, vehicular data in a preset time length prior to the monitoring the sensor signal into a preset permanent storage area.

9. The apparatus according to claim 8, wherein the encrypting the vehicular data to obtain encrypted vehicular data, and storing the encrypted vehicular data comprises:
encrypting the vehicular data using the transmission key;
determining whether a time difference between a start time of writing encrypted vehicular data having not been written in a storage area corresponding to the vehicular data into the storage area corresponding to the vehicular data from a start address of the storage area and a current time is greater than a preset time length;
writing the encrypted vehicular data having not been written in the storage area into the storage area corresponding to the vehicular data from the start address of the storage area corresponding to the vehicular data by overwriting if the time difference between the start time of writing the encrypted vehicular data having not been written in the storage area corresponding to the vehicular data into the storage area corresponding to the vehicular data from the start address of the storage area and the current time is greater than the preset time length; and
writing the encrypted vehicular data having not been written in the storage area corresponding to the vehicular data into the storage area corresponding to the vehicular data from a start address of a remaining storage space of the storage area if the time difference between the start time of writing the encrypted vehicular data having not been written in the storage area corresponding to the vehicular data into the storage area corresponding to the vehicular data from the start address of the storage area and the current time is less than or equal to the preset time length.

* * * * *